US006916883B2

(12) United States Patent
Parikh et al.

(10) Patent No.: US 6,916,883 B2
(45) Date of Patent: Jul. 12, 2005

(54) ETHYLENE INTERPOLYMER POLYMERIZATIONS

(75) Inventors: Deepak R. Parikh, Baton Rouge, LA (US); Brian W. S. Kolthammer, Lake Jackson, TX (US); Robert S. Cardwell, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/931,821

(22) Filed: Sep. 1, 2004

(65) Prior Publication Data

US 2005/0038195 A1 Feb. 17, 2005

Related U.S. Application Data

(63) Continuation of application No. 10/348,109, filed on Jan. 20, 2003, now abandoned, which is a division of application No. 08/858,664, filed on May 19, 1997, now Pat. No. 6,538,070, which is a continuation of application No. 08/698,487, filed on Aug. 15, 1996, now abandoned, which is a continuation of application No. 08/452,472, filed on May 26, 1995, now abandoned, which is a division of application No. 08/208,068, filed on Mar. 8, 1994, now abandoned, which is a continuation of application No. 07/815,716, filed on Dec. 30, 1991, now abandoned.

(51) Int. Cl.$^7$ .......................... C08F 8/00; C08F 210/00; C08L 23/00; C08L 23/04

(52) U.S. Cl. ...................... 525/191; 525/240; 526/348

(58) Field of Search ................................ 525/191, 240; 526/348

(56) References Cited

U.S. PATENT DOCUMENTS

| | | | |
|---|---|---|---|
| 3,491,073 A | 1/1970 | Marinak | |
| 3,645,992 A | 2/1972 | Elston | |
| 4,263,422 A | 4/1981 | Lowery, Jr. et al. | 526/97 |
| 4,530,914 A | 7/1985 | Ewen et al. | 502/113 |
| 4,935,474 A | 6/1990 | Ewen et al. | 526/114 |
| 4,937,299 A | 6/1990 | Ewen et al. | 526/119 |
| 4,939,217 A | 7/1990 | Stricklen | 526/114 |
| 5,026,798 A | 6/1991 | Canich | 526/127 |
| 5,055,438 A | 10/1991 | Canich | 502/117 |
| 5,064,802 A | 11/1991 | Stevens et al. | 526/134 |
| 5,082,902 A | 1/1992 | Gurevitch et al. | 525/240 |
| 5,189,192 A | 2/1993 | LaPointe et al. | 556/11 |
| 5,382,631 A | 1/1995 | Stehling et al. | 525/240 |
| 6,369,176 B1 | 4/2002 | Laughner et al. | 526/114 |
| 6,610,800 B2 | 8/2003 | Laughner et al. | 526/114 |

OTHER PUBLICATIONS

*Journal of the American Chemical Society*, 98:7, pp. 1729–1742 (Mar. 31, 1976) "Structure and Chemistry of Bis(cyclopentadienyl)– MLn Complexes" by Joseph W. Lauher and Roald Hoffman.

*Angew, Chem. Int. Ed. Engl.* pp. 630–632 (1976) vol. 15, No. 10 "Halogen–Free Soluble Ziegler Catalysts for the Polymerization of Ethylene, Control of Molecalar Weight by Choice of Temperature", by Arne Andresen et al.

*Advances in Organometallic Chemistry*, pp. 99–148, vol. 18, (1980) "Ziegler–Natta Catalysts" by Hansjorg Sim and Walter Kaminsky.

*Angew. Chem. Int. Ed. Engl.* pp. 390–393, vol. 19 No. 5 (1980) "Living Polymers on Polymerization with Extremely Productive Ziegler Catalysts" by Hansjorg Sinn, Walter Kaminsky, Hans–Jurgen Vollmer, and Rudiger Woldt.

*Polymer Bulletin*, p, pp. 464–469 (1983) "Halogen Free Soluble Ziegler Catalysts with Methylalumoxan as Catalyst" by Jens Herwig and Walter Kaminsky.

*Makromol. Chem., Rapid Commun.* 4, pp. 417–421 (1983) "Bis(cyclopentadienyl)zirkon–Verbinguyngen aund Aluminoxan als Ziegler–Katalysaioren fur die Polymerisation und Copolymerisation von Olefinen" by Walter Kaminsky et al.

*Antec Proceedings*. pp. 306–309(1983). "Analysis of Long Chain Branching in High Density Polyethylene" by J.K. Hughes.

*Makromol, Chem., Rapid Coomun.*, (5) pp. 225–228 (1984) "Influence of hydrogen on the polymerization of ethylene with the homogeneous Ziegler system bis(cyclopeniadleny) zirconiumdicholoride/aluminoxane" by Walter Karninsky et al.

*Journal of Polymer Science: Polymer Chemistry Edition*. pp. 2117–2133 (1985) vol. 25 "Homogeneous Ziegler–Nan Catalysis. II. Ethylene Polymerization by IVB Transistion Metal Complexes/Methyl Aluminoxane Catalyst Systeme" by E. Gannetti and R. Mazzocchi.

(Continued)

*Primary Examiner*—Nathan M. Nutter
(74) *Attorney, Agent, or Firm*—Whyte Hirschboeck Dudek SC (57) ABSTRACT

A new process of interpolymerizing ethylene interpolymer products having improved properties, such as increased onset of crystallization temperature, is disclosed. Preferably, the process comprises interpolymerizing a first homogeneous ethylene/alpha-olefin interpolymer and at least one second homogeneous ethylene/alpha-olefin interpolymer using at least two constrained geometry catalysts having different reactivities such that the first ethylene/alpha-olefin interpolymer has a narrow molecular weight distribution (NMWD) with a very high comonomer content and relatively high molecular weight and the second ethylene/alpha-olefin interpolymer has a NMWD with a low comonomer content and a molecular weight lower than that of the first interpolymer. The resultant first homogeneous interpolymer is combined with the resultant second homogeneous interpolymer in appropriate weight ratios resulting in the desired finished polymer structure. The first interpolymer and the second interpolymer can be polymerized in a single reactor or they can be polymerized in separate reactors operated in parallel or series.

2 Claims, 2 Drawing Sheets

OTHER PUBLICATIONS

*Makromol. Chem., Macromol. Symp.*, 4, pp. 103–118 (1986) "Elastomers by Atactic Linkage of a–Olfins Using Soluble Ziegler Catalysts" by W. Kaminsky and M. Schlobohm.

*Makromol. Chem.*, 190, pp. 515–526 (1989) "Copolymerization of Cycloalkenes with Ethylene In Presence of Chiral Zirconocene Catalysts" by W. Kaminsky and R. Spiehl.

*Makromol. Chem., Repid Commun.* pp. 89–94 (1990) Terpolymers of Ethylene, Propene and 1.5 Hexadiene Synthesized with Zirconocene/Methylaluminoxane by W. Kaminsky and H. Drogemuller.

*Proceedings of the 1991 IEEE Power Engineering Society*, pp. 184–190 (Sep. 22–27, 1991), New Specialty Linear Polymers (SLP) for Power Cables by Monica Hendewek and Lawrence Spenadel.

*Society of Plastic Engineers Proceedings*. Polyolefins VII International Conference, Feb. 24–27, 1991 "Structure/Property Relationships in Exxpol™ Polymers" (pp. 45–66) by C. Speed, B. Trudell, A. Mchta. And F. Stchling.

*1991 Specialty Polyolefins Conference Proceedings*. "The Marketing Challenge Created By Single Site Catalysts in Polyolefins" Sep. 24, 1991, (pp. 41–45) by Michael P. Jeffries.

*1991 Polymers, Laminations & Coatings Conference*, TAPPJ Proceedings, presented in Feb., 1991. pp. 289–296. A New Family of Linear Ethylene Polymers with Enhanced Sealing Performance , by D. Van der Sanden and R. W. Halle.

*Advances in Polyolefins* By R. B. Seymour and T. Cheng. (1987) "New Catalysis and Process for Ethylene Polymerization", pp. 337–354, by Karol. B. Wagner. I Levine, G. Goeke, and a A. Noshay.

Advances in Polyolefins, by R. B. Seymour and T. Cheng, (1987) "Polymerization of Olefins With A Homogenous Zirconium/Alumoxane Catalyst" pp. 361–371 by W. Kaminsky and H. Hansen.

ETHYLENE INTERPOLYMER POLYMERIZATIONS

CROSS-REFERENCE TO RELATED APPLICATIONS

This application is a continuation of U.S. Ser. No. 10/348,109, filed Jan. 20, 2003, abandoned, which is a division of U.S. Ser. No. 08/858,664, filed May 19, 1997, (now U.S. Pat. No. 6,538,070), which is a continuation of U.S. Ser. No. 08/698,487, filed Aug. 15, 1996, abandoned, which is a continuation of U.S. Ser. No. 08/452,472, filed May 26, 1995, abandoned, which is a division of U.S. Ser. No. 08/208,068, filed Mar. 8, 1994, abandoned, which is a continuation of U.S. Ser. No. 07/815,716, filed Dec. 30, 1991, abandoned, each of which is hereby incorporated herein.

FIELD OF THE INVENTION

This invention relates to processes of manufacturing ethylene interpolymer products which have improved properties, especially increased onset of crystallization temperature. The ethylene interpolymer products are made by a polymerization with two or more constrained geometry catalysts having varying reactivities. The interpolymer products can also be made by polymerization reactions in two or more separate, parallel reactors, with the resultant interpolymers intimately combined.

BACKGROUND OF THE INVENTION

Thermoplastic polymers can be classified as semi-crystalline (at least partly crystalline), highly crystalline, or wholly or mainly amorphous. Crystalline or semi-crystalline polymers typically have a distinct melting point, as measured by differential scanning calorimetry (DSC). Crystalline and semi-crystalline polymers are typically melt-processed into fibers, films or molded articles.

Controlling the nucleation and crystallization rates of the polymers during melt processing is important in determining the physical properties of the finished article. Various methods of controlling nucleation and crystallization have been attempted, usually incorporating nucleating agents (e.g., inactive (physical) or active (chemical)) or completely changing polymers. Physical nucleating agents are typically finely divided particles and have a melting and freezing temperature greater than that of the polymer in which the particles are utilized while the chemical nucleating agents are primarily combinations of acidic and basic compounds such as organic or inorganic compounds. Unfortunately, the particulate nucleating agents can also detrimentally affect the physical properties of the final product, for example by lowering the tensile strength of film made from the polymers.

Copending application Ser. No. 07/609,286, filed Nov. 5, 1990, has solved this particulate nucleation problem by blending linear polyethylene with other polyethylenes to cause the blend to have an increased onset of crystallization. While this process is effective, economic considerations can also affect the ability of polymers to be melt blended cost effectively.

Many methods of polymerizing polymers and forming polymer blends to do specific jobs are disclosed in the literature. For example, U.S. Pat. No. 4,937,299 (Ewen et al.) teaches the use of a homogeneous catalyst system comprising at least two different mono-, di- or tricyclopentadienyls and their derivatives of a Group 4b, 5b and 6b transition metal each having different reactivity ratios and aluminoxane. The catalyst system is described as being homogeneous in a solution polymerization system and that the soluble (i.e., homogeneous) catalyst can be converted to a heterogeneous catalyst system by depositing it on a catalyst support. Thus, U.S. Pat. No. 4,937,299 describes their homogeneous catalyst system as a soluble catalyst system.

International Patent Application Number PCT/US89/04259 (Stehling et al.) discloses linear ethylene interpolymer blends of interpolymers having narrow molecular weight distributions and narrow composition distributions. The components of the blends are said to have narrow molecular weight distributions (i.e., the ratio of the weight average molecular weight to the number average molecular weight is less than or equal to 3.0). The components are said to be prepared by using metallocene catalyst systems known to provide narrow composition distributions and narrow molecular weight distributions. The desirable molecular weight and composition distributions are said to be obtained by blending different components or by polymerization of the blend components in the same or multiple reactors.

SUMMARY OF THE INVENTION

A new ethylene polymerization process has now been discovered to produce ethylene polymer products having many improved properties, including increased onset of crystallization temperature.

The ethylene polymerization process comprises the steps of:

(a) polymerizing a first homogeneous ethylene polymer using a first activated constrained geometry catalyst composition having a first reactivity such that the first polymer has a melt index of from about 0.05 to about 50 grams/10 minutes, (b) polymerizing at least one second homogeneous ethylene polymer using a second activated constrained geometry catalyst composition having a second reactivity such that the second ethylene polymer has a melt index of from about 0.05 to about 50 grams/10 minutes, and (c) combining from about 50 to about 95 weight percent of the first ethylene polymer with from about 5 to about 50 weight percent of the second ethylene polymer to form an ethylene polymer product.

Preferably, the homogeneous ethylene polymers are ethylene/alpha-olefin interpolymers.

The polymerized ethylene and interpolymerized ethylene/alpha-olefin products have increased onset of crystallization temperature as well as improved cling and low hexane extractables when converted to film form.

The activated constrained geometry catalyst compositions used in the interpolymerization process of the present invention can be made and injected separately into separate polymerization reactors, or, preferably, injected separately into the same polymerization reactor, or, especially, they can be injected together into the same polymerization reactor.

DETAILED DESCRIPTION OF THE INVENTION

The homogeneous polymers and interpolymers of the present invention are herein defined as defined in U.S. Pat.

No. 3,645,992, the disclosure of which is incorporated herein by reference. Accordingly, homogeneous interpolymers are those in which the comonomer is randomly distributed within a given interpolymer molecule and wherein substantially all of the interpolymer molecules have the same ethylene/comonomer ratio within that interpolymer, whereas heterogeneous interpolymers are those in which the interpolymer molecules do not have the same ethylene/comonomer ratio.

Figure 1:
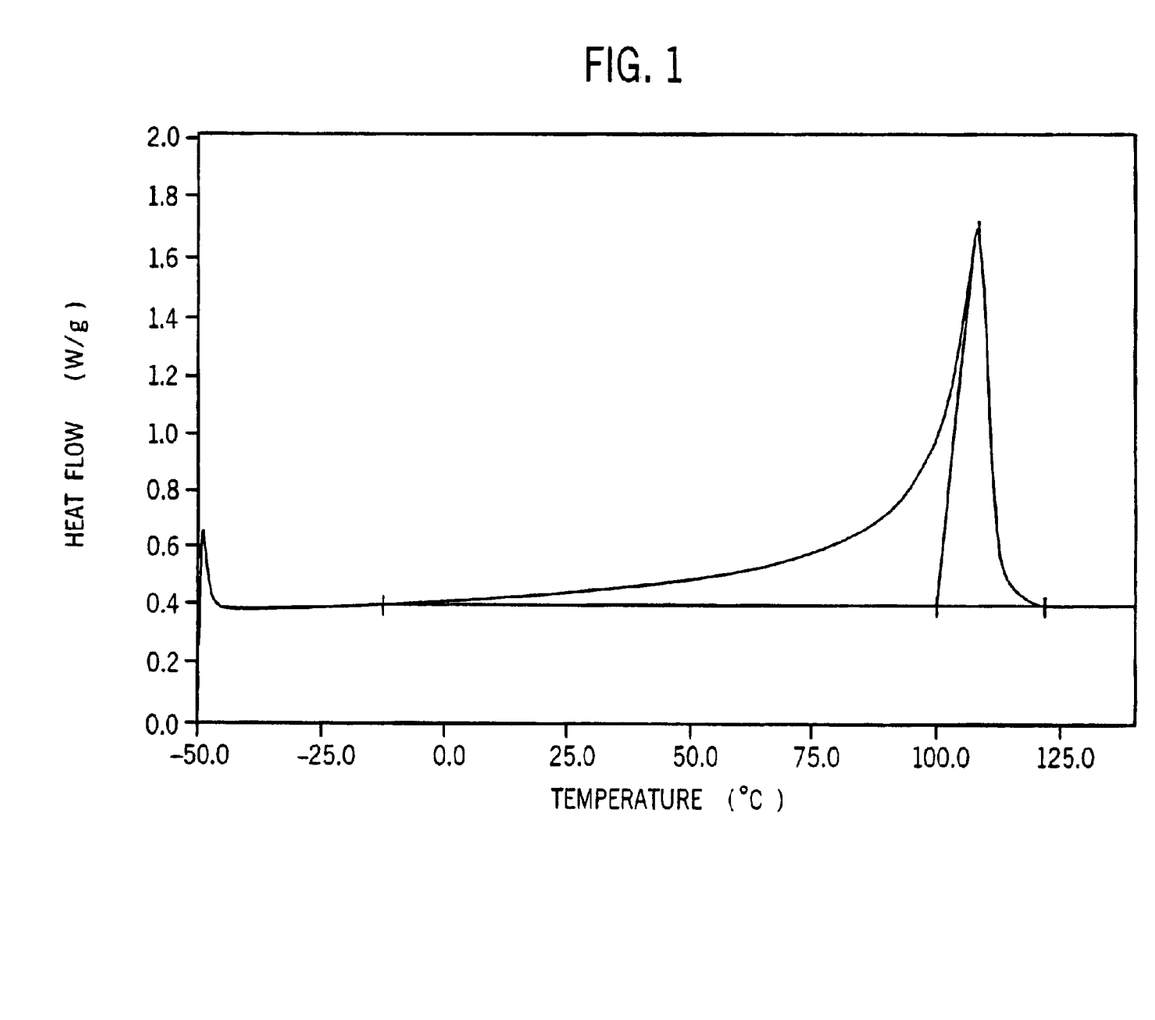
FIG. 1 shows a differential scanning calorimetry melting curve for a homogeneous interpolymer of the present invention.
Figure 2:
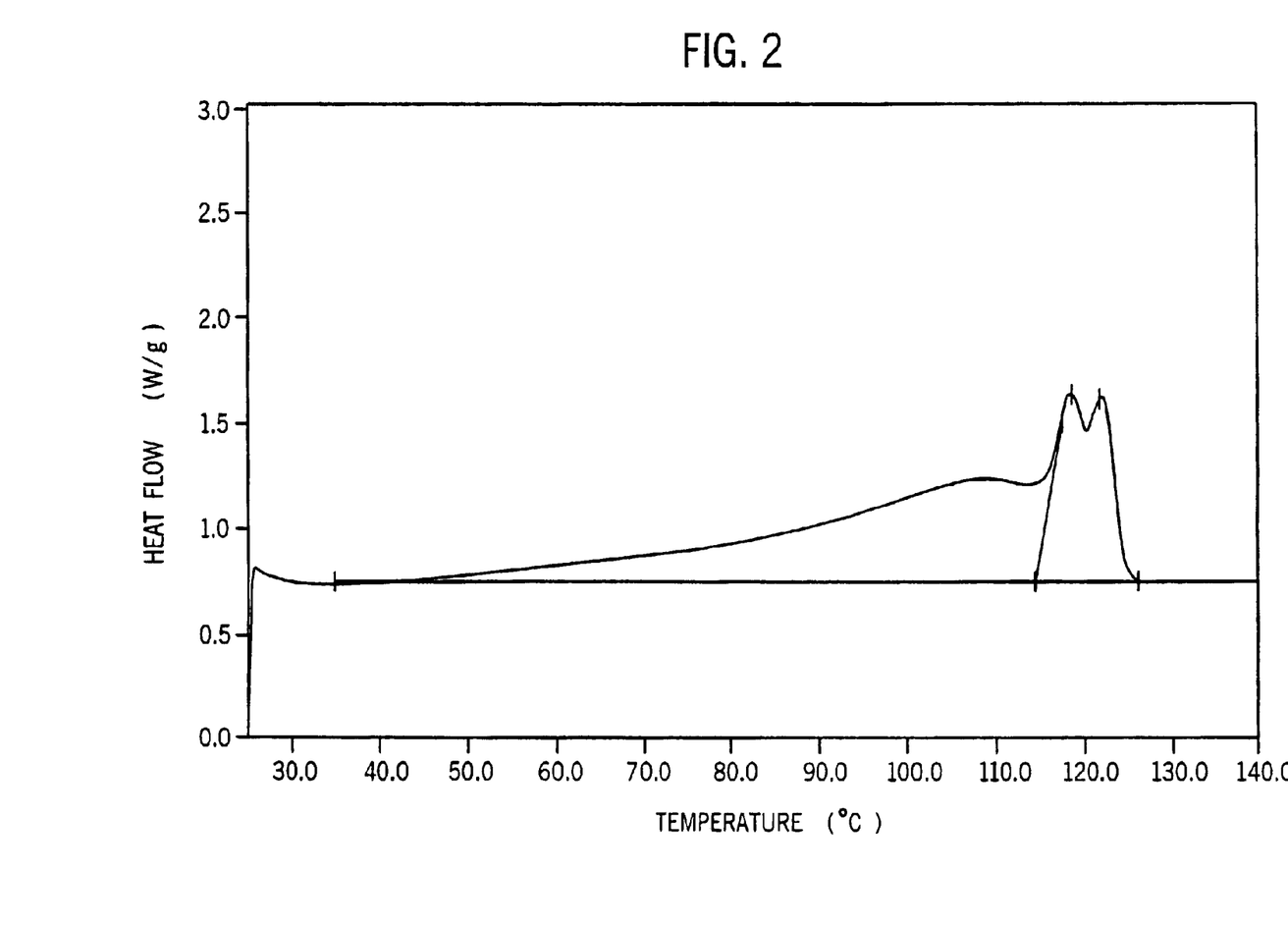
FIG. 2 shows a differential scanning calorimetry melting curve for a comparative heterogeneous polymer.

In addition, the homogeneous interpolymers of the present invention have a melting curve which resembles that depicted in FIG. 2 (i.e., a single melting peak), as opposed to the multiple melting peak demonstrated by a comparative heterogeneous polymer shown in FIG. 3.

The homogeneous polymers used to make the novel polymer products of the present invention can be ethylene homopolymers or, preferably, interpolymers of ethylene with at least one $C_3$–$C_{20}$ α-olefin and/or $C_4$–$C_{18}$ diolefins. The homogeneous interpolymers of the present invention can also be interpolymers of ethylene with at least one of the above $C_3$–$C_{20}$ α-olefins and/or diolefins. The term "interpolymer" is used herein to indicate a copolymer, or a terpolymer, or the like. That is, at least one other comonomer is polymerized with ethylene to make the interpolymer. Therefore, in another aspect, the invention is a process for preparing an ethylene/alpha-olefin terpolymer product, comprising the steps of:

(a) interpolymerizing ethylene, a first comonomer and a second comonomer to form a homogeneous terpolymer using a first activated constrained geometry catalyst composition having a first reactivity and a second activated constrained geometry catalyst composition having a second reactivity to form an ethylene/alpha-olefin terpolymer product, and (b) recovering the ethylene/alpha-olefin terpolymer product.

Other unsaturated monomers usefully polymerized according to the present invention include, for example, ethylenically unsaturated monomers, conjugated or nonconjugated dienes, polyenes, etc. Preferred monomers include the $C_2$–$C_{10}$ α-olefins especially ethylene, 1-propene, isobutylene, 1-butene, 1-hexene, 4-methyl-1-pentene, and 1-octene. Other preferred monomers include styrene, halo- or alkyl substituted styrenes, tetrafluoroethylene, vinylbenzocyclobutane, 1,4-hexadiene, and naphthenics (e.g., cyclopentene, cyclohexene and cyclooctene).

The density of the homogeneous polymers used to make the novel interpolymer products of the present invention can be any density appropriate to the selected end use application, e.g., higher density products for higher modulus applications. Preferably the density is from about 0.88 grams/cubic centimeter (g/cm3) to about 0.965 g/cm3. Density measurements are determined herein according to ASTM D-792.

The molecular weight of the homogeneous polymers used to make the novel polymer products of the present invention is usually indicated and measured by melt index. The melt index is according to ASTM D-1238, Condition (E) (i.e., 190° C./2.16 kilograms) and is also known as $I_2$. The $I_2$ of the homogeneous polymers used to make the novel interpolymer products of the present invention can also be convenient to the chosen end use application, but preferably is from about 0.01 grams/10 minutes to about 1000 g/10 minutes.

The melt flow ratio is indicated and measured by $I_{10}/I_2$ according to ASTM D-1238, Conditions (N) (190° C./10 kilograms) and (E), respectively. The $I_{10}/I_2$ of the novel polymer products of the present invention can also be conveniently chosen specific to the desired end use application, but preferably is from about 6 to about 16. Accordingly, the $I_{10}/I_2$ ratios of the specific homogeneous polymers used to make up the novel interpolymer products can be appropriately selected.

The first process disclosed herein for producing the novel interpolymer products is also effective when using at least two reactors, especially when a first reactor and a second reactor are operated in series, i.e., one after the other. The first process is also particularly effective when both the ethylene copolymers of (a) and (b) are ethylene/alpha-olefin interpolymers.

A preferred interpolymerization process of the present invention comprises the steps of:

(a) polymerizing a first homogeneous ethylene/alpha-olefin interpolymer using a first constrained geometry catalyst having a first reactivity such that the first interpolymer has from about 5 to about 30 weight percent comonomer content, a melt index of from about 0.05 to about 50 grams/10 minutes, a melting point less than about 110° C., preferably from about 70° C. to about 110° C., (b) polymerizing at least one second homogeneous ethylene/alpha-olefin interpolymer using a second constrained geometry catalyst having a second reactivity such that the second ethylene/alpha-olefin interpolymer has from about 2 to about 10 weight percent comonomer content, a melt index of from about 0.05 to about 50 grams/10 minutes, a melting point greater than about 115° C., preferably from about 115° C. to about 130° C., and (c) combining from about 50 to about 95 weight percent of the first ethylene/alpha-olefin interpolymer with from about 5 to about 50 weight percent of the second ethylene/alpha-olefin interpolymer to form an ethylene/alpha-olefin interpolymer product.

When the interpolymers made in steps (a) and (b) are combined, an ethylene/alpha-olefin interpolymer product is formed having from about 5 to about 20 weight percent comonomer content, a melt index of from about 0.5 to about 50 grams/10 minutes, and an $I_{10}/I_2$ ratio of from about 6 to about 12 and, preferably, an Mw/Mn of from about 2 to about 6, and especially from about 3 to about 6. More preferably, the first homogeneous ethylene/alpha-olefin interpolymer made in step (a) has a narrow molecular weight distribution (NMWD) (i.e., $2 \leq M_w/M_n \leq 5$ with a very high comonomer content (i.e., $10 \leq$ comonomer content $\leq 30$) and relatively high molecular weight (i.e., $0.05 \leq I_2 \leq 5$) and the second homogeneous ethylene/alpha-olefin interpolymer made in step (b) has a NMWD (i.e., $2 \leq M_w/M_n \leq 5$) with a low comonomer content (i.e., $2 \leq$ comonomer content $\leq 6$) and a molecular weight lower than that of the first interpolymer.

The use of the dual reactivity constrained geometry catalysts can produce interpolymer products that satisfy a variety of requirements such as:

(i) improved nucleation of polymers by adding a medium molecular weight, linear fraction, polyethylene;

(ii) improved cling potential for stretch-cling polymers by producing an interpolymer fraction with a low molecular weight (MW) and high branch content;

(iii) improved ultra low density polyethylene (ULDPE) by making a high MW fraction with a medium branch content which would improve film properties but not increase hexane extractables;

(iv) improved optical properties (e.g., clarity and haze), even for thermally formed articles made from the interpolymer products having higher densities; and (v) higher modulus of thermally formed articles made from the interpolymer product blends.

The interpolymer products made by polymerizing in two separate reactors and subsequently combining melt streams (parallel reactors) yields composite interpolymer product blends. At least one part of the composite interpolymer product blend, preferably from about 20–80 percent of the blend, has a melting point less than about 115° C., while at least another part of the blend has a melting point greater than about 120° C.

Constrained Geometry Catalyst Preparation

Constrained geometry catalyst preparation is described in detail in U.S. application Ser. Nos. 401,345 and 401,344, both filed Aug. 31, 1989; Ser. Nos. 428,082, 428,283 and 428,276, all filed Oct. 27, 1989; Ser. No. 436,524, filed Nov. 14, 1989; Ser. No. 545,403, filed Jul. 3, 1990; and Ser. No. 776,130, filed Oct. 15, 1991. The disclosures of all of these U.S. Applications are incorporated herein by reference.

Suitable catalysts for use herein preferably include constrained geometry catalysts as disclosed in U.S. application Ser. Nos. 545,403, filed Jul. 3, 1990; 758,654, filed Sep. 12, 1991; 758,660, filed Sep. 12, 1991; and 720,041, filed Jun. 24, 1991, the teachings of all of which are incorporated herein by reference. The monocyclopentadienyl transition metal olefin polymerization catalysts taught in U.S. Pat. No. 5,026,798, the teachings of which are incorporated herein by reference, are also suitable for use in preparing the polymers of the present invention.

The foregoing catalysts may be generally further described as comprising a metal coordination complex comprising a metal of groups 3–10 or the Lanthanide series of the Periodic Table of the Elements, preferably a metal of groups 3–6, and especially a metal of groups 4 and 5, and a delocalized π-bonded moiety substituted with a constrain inducing moiety, said complex having a constrained geometry about the metal atom such that the angle at the metal between the centroid of the delocalized, substituted π-bonded moiety and the center of at least one remaining substituent is less than such angle in a similar complex containing a similar π-bonded moiety lacking in such constrain-inducing substituent, and provided further that for such complexes comprising more than one delocalized, substituted π-bonded moiety, only one thereof for each metal atom of the complex is a cyclic, delocalized, substituted π-bonded moiety. The catalyst further comprises an activating cocatalyst.

Preferred catalyst complexes correspond to the formula:

I wherein:

M is a metal of group 3–10, or the Lanthanide series of the Periodic Table of the Elements;

Cp* is a cyclopentadienyl or substituted cyclopentadienyl group bound in an η$^5$ bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group or neutral Lewis base ligand group having up to 30 non-hydrogen atoms;

n is 0, 1, 2, 3, or 4 and is 2 less than the valence of M; and

Y is an anionic or nonanionic ligand group bonded to Z and M comprising nitrogen, phosphorus, oxygen or sulfur and having up to 20 non-hydrogen atoms, optionally Y and Z together form a fused ring system.

More preferably still, such complexes correspond to the formula:

wherein R' each occurrence is independently selected from the group consisting of hydrogen, alkyl, aryl, silyl, germyl, cyano, halo and combinations thereof having up to 20 non-hydrogen atoms;

X each occurrence independently is selected from the group consisting of hydride, halo, alkyl, aryl, silyl, germyl, aryloxy, alkoxy, amide, siloxy, neutral Lewis base ligands and combinations thereof having up to 20 non-hydrogen atoms;

Y is —O—, —S—, —NR*—, —PR*—, or a neutral two electron donor ligand selected from the group consisting of OR*, SR*, NR*$_2$, or PR*$_2$;

M is a previously defined; and

Z is SiR*$_2$, CR*$_2$, SiR*$_2$SiR*$_2$, CR*$_2$CR*$_2$, CR*=CR*, CR*$_2$SiR*$_2$, GeR*$_2$, BR*, BR*$_2$; wherein:

R* each occurrence is independently selected from the group consisting of hydrogen, alkyl, aryl, silyl, halogenated alkyl, halogenated aryl groups having up to 20 non-hydrogen atoms, and mixtures thereof, or two or more R* groups from Y, Z, or both Y and Z form a fused ring system; and n is 1 or 2.

It should be noted that whereas formula I and the following formulas indicate a cyclic structure for the catalysts, when Y is a neutral two electron donor ligand, the bond between M and Y is more accurately referred to as a coordinate-covalent bond. Also, it should be noted that the complex may exist as a dimer or higher oligomer.

Further preferably, at least one of R', Z, or R* is an electron donating moiety. Thus, highly preferably Y is a nitrogen or phosphorus containing group corresponding to the formula —N(R")— or —P(R")—, wherein R" is C$_{1-10}$ alkyl or aryl, i.e., an amido or phosphido group.

Most highly preferred complex compounds are amidosilane- or amidoalkanediyl-compounds corresponding to the formula:

wherein:

M is titanium, zirconium or hafnium, bound in an η$^5$ bonding mode to the cyclopentadienyl group;

R' each occurrence is independently selected from the group consisting of hydrogen, silyl, alkyl, aryl and combinations thereof having up to 10 carbon or silicon atoms;

E is silicon or carbon;

X independently each occurrence is hydride, halo, alkyl, aryl, aryloxy or alkoxy of up to 10 carbons;

m is 1 or 2; and n is 1 or 2.

Examples of the above most highly preferred metal coordination compounds include compounds wherein the R' on the amido group is methyl, ethyl, propyl, butyl, pentyl, hexyl, (including isomers), norbornyl, benzyl, phenyl, etc.; the cyclopentadienyl group is cyclopentadienyl, indenyl, tetrahydroindenyl, fluorenyl, octahydrofluorenyl, etc.; R' on the foregoing cyclopentadienyl groups each occurrence is hydrogen, methyl, ethyl, propyl, butyl, pentyl, hexyl, (including isomers), norbornyl, benzyl, phenyl, etc.; and X is chloro, bromo, iodo, methyl, ethyl, propyl, butyl, pentyl, hexyl, (including isomers), norbornyl, benzyl, phenyl, etc. Specific compounds include: (tert-butylamido)(tetramethyl-$\eta^5$-cyclopentadienyl)-1,2-ethanediylzirconium dichloride, (tert-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylzirconium dichloride, (methylamido)(tetramethyl-$\eta^5$-cyclopentadienyl)-1,2-ethanediyltitanium dichloride, (ethylamido)(tetramethyl-$\eta^5$-cyclopentadienyl)methylenetitanium dichloro, (tert-butylamido)dibenzyl(tetramethyl-$\eta^5$-cyclopentadienyl)silanezirconium dibenzyl, (benzylamido)dimethyl (tetramethyl-$\eta^5$-cyclopentadienyl)silanetitanium dichloride, (phenylphosphido)dimethyl(tetramethyl-$\eta^5$-cyclopentadienyl)silanezirconium dibenzyl, (tert-butylamido)dimethyl(tetramethyl-$\eta^5$-cyclopentadienyl)silanetitanium dimethyl, and the like.

The complexes may be prepared by contacting a derivative of a metal, M, and a group I metal derivative or Grignard derivative of the cyclopentadienyl compound in a solvent and separating the salt byproduct. Suitable solvents for use in preparing the metal complexes are aliphatic or aromatic liquids such as cyclohexane, methylcyclohexane, pentane, hexane, heptane, tetrahydrofuran, diethyl ether, benzene, toluene, xylene, ethylbenzene, etc., or mixtures thereof.

In a preferred embodiment, the metal compound is $MX_{n+1}$, i.e. M is in a lower oxidation state than in the corresponding compound, $MX_{n+2}$ and the oxidation state of M in the desired final complex. A noninterfering oxidizing agent may thereafter be employed to raise the oxidation state of the metal. The oxidation is accomplished merely by contacting the reactants utilizing solvents and reaction conditions used in the preparation of the complex itself. By the term "noninterfering oxidizing agent" is meant a compound having an oxidation potential sufficient to raise the metal oxidation state without interfering with the desired complex formation or subsequent polymerization processes. A particularly suitable noninterfering oxidizing agent is AgCl or an organic halide such as methylene chloride. The foregoing techniques are disclosed in U.S. Ser. No. 545,403, filed Jul. 3, 1990 and U.S. Ser. No. 702,475, filed May 20, 1991, the teachings of both of which are incorporated herein by reference.

Additionally the complexes may be prepared according to the teachings of the copending application entitled: "Preparation of Metal Coordination Complex (I)", filed in the names of Peter Nickias and David Wilson, on Oct. 15, 1991 and the copending application entitled: "Preparation of Metal Coordination Complex (II)", filed in the names of Peter Nickias and David Devore, on Oct. 15, 1991, the teachings of which are incorporated herein by reference thereto.

Suitable cocatalysts for use herein include polymeric or oligomeric aluminoxanes, especially methyl aluminoxane, as well as inert, compatible, noncoordinating, ion forming compounds. Preferred catalyst compositions are formed using cocatalysts which are inert, noncoordinating, boron compounds.

Ionic active catalyst species which can be used to polymerize the polymers described herein correspond to the formula:

wherein:

M is a metal of group 3–10, or the Lanthanide series of the Periodic Table of the Elements;

Cp* is a cyclopentadienyl or substituted cyclopentadienyl group bound in an $\eta^5$ bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group or neutral Lewis base ligand group having up to 30 non-hydrogen atoms;

n is 0, 1, 2, 3, or 4 and is 2 less than the valence of M; and $A^-$ is a noncoordinating, compatible anion.

One method of making the ionic catalyst species which can be utilized to make the polymers of the present invention involve combining:

a) at least one first component which is a mono (cyclopentadienyl) derivative of a metal of Group 3–10 or the Lanthanide Series of the Periodic Table of the Elements containing at least one substituent which will combine with the cation of a second component (described hereinafter) which first component is capable of forming a cation formally having a coordination number that is one less than its valence, and b) at least one second component which is a salt of a Bronsted acid and a noncoordinating, compatible anion.

More particularly the noncoordinating, compatible anion of the Bronsted acid salt may comprise a single coordination complex comprising a charge-bearing metal or metalloid core, which anion is both bulky and non-nucleophilic. The recitation "metalloid", as used herein, includes non-metals such as boron, phosphorus and the like which exhibit semi-metallic characteristics.

Illustrative, but not limiting examples of monocyclopentadienyl metal components (first components) which may be used in the preparation of cationic complexes are derivatives of titanium, zirconium, vanadium, hafnium, chromium, lanthanum, etc. Preferred components are titanium or zirconium compounds. Examples of suitable monocyclopentadienyl metal compounds are hydrocarbyl-substituted monocyclopentadienyl metal compounds such as (tert-butylamido)(tetramethyl-$\eta^5$-cyclopentadienyl)-1,2-ethanediylzirconium dimethyl, (tert-butylamido)(tetramethyl-$\eta^5$-cyclopentadienyl)-1,2-ethanediyltitanium dimethyl, (methylamido)(tetramethyl-$\eta^5$-cyclopentadienyl)-1,2-ethanediylzirconium dibenzyl, (methylamido)(tetramethyl-$\eta^5$-cyclopentadienyl)-1,2-ethanediyltitanium dimethyl, (ethylamido)(tetramethyl-$\eta^5$-cyclopentadienyl)methylenetitanium dimethyl, (tert-butylamido)dibenzyl(tetramethyl-$\eta^5$-cyclopentadienyl)silanezirconium dibenzyl, (benzylamido)dimethyl(tetramethyl-$\eta^5$-cyclopentadienyl)silanetitanium diphenyl, (phenylphosphido)dimethyl(tetramethyl-$\eta^5$-cyclopentadienyl)silanezirconium dibenzyl, and the like.

Such components are readily prepared by combining the corresponding metal chloride with a dilithium salt of the substituted cyclopentadienyl group such as a cyclopentadienyl-alkanediyl-amide, or cyclopentadienyl-silane amide compound. The reaction is conducted in an inert liquid such as tetrahydrofuran, $C_{5-10}$ alkanes, toluene, etc. utilizing conventional synthetic procedures. Additionally, the first components may be prepared by reaction of a group II derivative of the cyclopentadienyl compound in a solvent and separating the salt by-product. Magnesium derivatives of the cyclopentadienyl compounds are preferred. The reaction may be conducted in an inert solvent such as cyclohexane, pentane, tetrahydrofuran, diethyl ether, benzene, toluene, or mixtures of the like. The resulting metal cyclopentadienyl halide complexes may be alkylated using a variety of techniques. Generally, the metal cyclopentadienyl alkyl or aryl complexes may be prepared by alkylation of the metal cyclopentadienyl halide complexes with alkyl or aryl derivatives of group I or group II metals. Preferred alkylating agents are alkyl lithium and Grignard derivatives using conventional synthetic techniques. The reaction may be conducted in an inert solvent such as cyclohexane, pentane, tetrahydrofuran, diethyl ether, benzene, toluene, or mixtures of the like. A preferred solvent is a mixture of toluene and tetrahydrofuran.

Compounds useful as a second component in the preparation of the ionic catalysts useful in this invention will comprise a cation, which is a Bronsted acid capable of donating a proton, and a compatible noncoordinating anion. Preferred anions are those containing a single coordination complex comprising a charge-bearing metal or metalloid core which anion is relatively large (bulky), capable of stabilizing the active catalyst species (the Group 3–10 or Lanthanide Series cation) which is formed when the two components are combined and sufficiently labile to be displaced by olefinic, diolefinic and acetylenically unsaturated substrates or other neutral Lewis bases such as ethers, nitrites and the like. Suitable metals, then, include, but are not limited to, aluminum, gold, platinum and the like. Suitable metalloids include, but are not limited to, boron, phosphorus, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

Highly preferably, the second component useful in the preparation of the catalysts of this invention may be represented by the following general formula:

$$(L-H)^+ [A]^-$$

wherein:
L is a neutral Lewis base;
$(L-H)^+$ is a Bronsted acid; and
$[A]^-$ is a compatible, noncoordinating anion.
More preferably $[A]^-$ corresponds to the formula:

$$[M'Q_q]^-$$

wherein:
M' is a metal or metalloid selected from Groups 5–15 of the Periodic Table of the Elements; and
Q independently each occurrence is selected from the Group consisting of hydride, dialkylamido, halide, alkoxide, aryloxide, hydrocarbyl, and substituted-hydrocarbyl radicals of up to 20 carbons with the proviso that in not more than one occurrence is Q halide and
q is one more than the valence of M'.

Second components comprising boron which are particularly useful in the preparation of catalysts of this invention may be represented by the following general formula:

$$[L-H]^+ [BQ_4]^-$$

wherein:
L is a neutral Lewis base;
$[L-H]^+$ is a Bronsted acid;
B is boron in a valence state of 3; and
Q is as previously defined.

Illustrative, but not limiting, examples of boron compounds which may be used as a second component in the preparation of the improved catalysts of this invention are trialkyl-substituted ammonium salts such as triethylammonium tetraphenylborate, tripropylammonium tetraphenylborate, tris(n-butyl)ammonium tetraphenylborate, trimethylammonium tetrakis(p-tolyl)borate, tributylammonium tetrakis(pentafluorophenyl)borate, tripropylammonium tetrakis(2,4-dimethylphenyl)borate, tributylammonium tetrakis(3,5-dimethylphenyl)borate, triethylammonium tetrakis(3,5-di-trifluoromethylphenyl)borate and the like. Also suitable are N,N-dialkylanilinium salts such as N,N-dimethylanilinium tetraphenylborate, N,N-diethylanilinium tetraphenylborate, N,N-2,4,6-pentamethylanilinium tetraphenylborate and the like; dialkylammonium salts such as di-(i-propyl)ammonium tetrakis(pentafluorophenyl)borate, dicyclohexylammonium tetraphenylborate and the like; and triaryl phosphonium salts such as triphenylphosphonium tetraphenylborate, tris(methylphenyl)phosphonium tetrakis(pentafluorophenyl)borate, tris(dimethylphenyl)phosphonium tetraphenylborate and the like.

Preferred ionic catalysts are those having a limiting charge separated structure corresponding to the formula:

wherein:
M is a metal of group 3–10, or the Lanthanide series of the Periodic Table of the Elements;
Cp* is a cyclopentadienyl or substituted cyclopentadienyl group bound in an $\eta^5$ bonding mode to M;
Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;
X independently each occurrence is an anionic ligand group or neutral Lewis base ligand group having up to 30 non-hydrogen atoms;
n is 0, 1, 2, 3, or 4 and is 2 less than the valence of M; and
$XA^{*-}$ is $^-XB(C_6F_5)_3$.

This class of cationic complexes may be conveniently prepared by contacting a metal compound corresponding to the formula:

wherein:

Cp*, M, and n are as previously defined, with tris(pentafluorophenyl)borane cocatalyst under conditions to cause abstraction of X and formation of the anion $^-XB(C_6F_5)_3$.

Preferably X in the foregoing ionic catalyst is $C_1$–$C_{10}$ hydrocarbyl, most preferably methyl.

The preceding formula is referred to as the limiting, charge separated structure. However, it is to be understood that, particularly in solid form, the catalyst may not be fully charge separated. That is, the X group may retain a partial covalent bond to the metal atom, M. Thus, the catalysts may be alternately depicted as possessing the formula:

The catalysts are preferably prepared by contacting the derivative of a Group 4 or Lanthanide metal with the tris(pentafluorophenyl)borane in an inert diluent such as an organic liquid. Tris(pentafluorphenyl)borane is a commonly available Lewis acid that may be readily prepared according to known techniques. The compound is disclosed in Marks, et al. *J. Am. Chem. Soc.* 1991, 113, 3623–3625 for use in alkyl abstraction of zirconocenes.

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

It is believed that in the constrained geometry catalysts used herein the metal atom is forced to greater exposure of the active metal site because one or more substituents on the single cyclopentadienyl or substituted cyclopentadienyl group forms a portion of a ring structure including the metal atom, wherein the metal is both bonded to an adjacent covalent moiety and held in association with the cyclopentadienyl group through an $\eta^5$ or other π-bonding interaction. It is understood that each respective bond between the metal atom and the constituent atoms of the cyclopentadienyl or substituted cyclopentadienyl group need not be equivalent. That is, the metal may be symmetrically or unsymmetrically π-bound to the cyclopentadienyl or substituted cyclopentadienyl group.

The geometry of the active metal site is further defined as follows. The centroid of the cyclopentadienyl or substituted cyclopentadienyl group may be defined as the average of the respective X, Y, and Z coordinates of the atomic centers forming the cyclopentadienyl or substituted cyclopentadienyl group. The angle, Θ, formed at the metal center between the centroid of the cyclopentadienyl or substituted cyclopentadienyl group and each other ligand of the metal complex may be easily calculated by standard techniques of single crystal X-ray diffraction. Each of these angles may increase or decrease depending on the molecular structure of the constrained geometry metal complex. Those complexes wherein one or more of the angles, Θ, is less than in a similar, comparative complex differing only in the fact that the constrain-inducing substituent is replaced by hydrogen have constrained geometry for purposes of the present invention. Preferably one or more of the above angles, Θ, decrease by at least 5 percent, more preferably 7.5 percent, compared to the comparative complex.

Preferably, monocyclopentadienyl metal coordination complexes of groups 3, 4, 5 or lanthanide metals according to the present invention have constrained geometry such that the angle, Θ, between the centroid of the Cp* group and the Y substituent is less than 115°, more preferably less than 110°, most preferably less than 105°, and especially less than 100°.

Other compounds which are useful in the catalyst compositions of this invention, especially compounds containing other Group 4 or Lanthanide metals, will, of course, be apparent to those skilled in the art.

It is important that the specific constrained geometry catalysts chosen for polymerizing the ethylene polymers or ethylene/alpha-olefin interpolymers be of differing reactivities. The differing reactivities can be achieved by using the same constrained geometry catalyst composition, and polymerizing at different reactor temperatures, or, preferably, by using two distinctly different catalysts which have different reactivity. For example, when the active metal site is selected from the group consisting of Ti, V, Hf and Zr, the reactivity of the active metal site will be in that order: Ti is more reactive than V, which in turn is more reactive than Hf, which in turn is more reactive than Zr. Accordingly, the polymer density will also increase in that same order, with a polymer made using a constrained geometry catalyst containing Zr having a higher density than a polymer made using a constrained geometry catalyst containing Ti. Obviously, other combinations of metal atoms are possible, such as combining Ti with Hf, or combining V with Zr. The instant intention is not limited to any particular combination of constrained geometry catalysts, with the stipulation that the selected constrained geometry catalysts have differing reactivities.

In general, the polymerization according to the present invention may be accomplished at conditions well known in the prior art for Ziegler-Natta or Kaminsky-Sinn type polymerization reactions, that is, temperatures from 0 to 250° C. and pressures from atmospheric to 1000 atmospheres (100 MPa). Suspension, solution, slurry, gas phase or other process conditions may be employed if desired. A support may be employed but preferably the catalysts are used in a homogeneous manner. It will, of course, be appreciated that the active catalyst system, especially nonionic catalysts, form in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

The polymerization conditions for manufacturing the polymers of the present invention are generally those useful in the solution polymerization process, although the application of the present invention is not limited thereto. Gas phase polymerization processes are also believed to be useful, provided the proper catalysts and polymerization conditions are employed.

Additives, such as anti-oxidants, slip agents, anti-block agents, pigments (e.g., titanium dioxide), wetting agents (as disclosed, e.g., in U.S. Pat. No. 4,578,414, and in U.S. Pat. No. 4,835,194, the disclosures of which are incorporated herein by reference) may be incorporated into the homogeneous polymers used to make the novel interpolymer products of the present invention to the extent that they do not interfere with the crystallization kinetic improvements demonstrated herein.

Fabricated (e.g., thermally formed) articles can be advantageously made from these novel interpolymer products. These articles include films (e.g., blown films, cast films, or extrusion coated films), molded articles (e.g., injection molded, blow molded, or roto molded articles), and fibers (e.g., melt blown, spunbond, or staple fibers and fabrics made from these fibers). Skilled artisans in the processability of conventional thermoplastics can readily form a variety of fabricated articles from these interpolymer products. In particular, the increased onset of crystallization temperature of these novel interpolymer products has utility in making fabricated articles which are rapidly cooled, e.g., blown film (control of the freeze line) or melt spun fibers (where the high surface area of the fibers and the limited quench air capabilities are often in conflict).

Molecular Weight Distribution Determination

The whole interpolymer product samples and the individual interpolymers samples are analyzed by gel permeation chromatography (GPC) on a Waters 150C high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3% by weight solutions of the samples are prepared for injection. The flow rate is 1.0 milliliter/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science*, Polymer Letters, Vol. 6, (621) 1968, incorporated herein by reference) to derive the equation:

$$M_{polyethylene}=a*(M_{polystyrene})^b$$

In this equation, a=0.4316 and b=1.0. Weight average molecular weight, $M_w$, is calculated in the usual manner according to the formula:

$$M_w = Rw_i * M_i$$

where $w_i$ and $M_i$ and are the weight fraction and molecular weight respectively of the ith fraction eluting from the GPC column.

Crystallization Onset Temperature Measurement

The crystallization onset temperatures of the blend components (i.e., the homogeneous polymers and interpolymers) and of the polymer and interpolymer products of the present invention are measured using differential scanning calorimetry (DSC). Each sample to be tested is made into a compression molded test plaque according to ASTM D 1928. The plaques are then microtomed at room temperature using a Reichert Microtome or razor blade to obtain samples having a thickness of about 15 microns. About 5 milligrams of each sample to be tested is placed in the DSC pan and heated to about 180° C., held at that temperature for 3 minutes to destroy prior heat history, cooled to −50° C. at a rate of 10° C./minute and held at that temperature for 2 minutes. The crystallization onset temperature and the peak temperature are recorded by the DSC as the temperature at which crystallization begins and the temperature at which the sample is as fully crystallized as possible, respectively, during the cooling period from 180° C. to −50° C. The sample is then heated again from −50° C. to 140° C. at a rate of 10° C./minute to record the heat of fusion and calculate total percent crystallinity. For polyethylene, the percentage crystallinity is obtained using the latent heat of fusion equal to 292 Joules/gram for 100 percent crystalline linear polyethylene.

Catalyst Preparation

Catalyst Complex

Preparation of (t-Butylamido)dimethyl(tetramethyl-$\eta^5$-cyclopentadienyl)silanetitanium dichloride Step 1

(Chloro)(dimethyl)(tetramethylcyclopentadi-2,4-enyl)silane

To a solution of 21.5 g (167 mmol) dimethyldichlorosilane in 150 mL THF cooled to −40° C. was slowly added a solution of 8.00 g (55.6 mmol) sodium 1,2,3,4-tetramethylcyclopentadienide in 80 mL THF. The reaction mixture was allowed to warm to room temperature and was stirred overnight. The solvent was removed, the residue was extracted with pentane and filtered. The pentane was removed under reduced pressure to give the product as a light-yellow oil.

Step 2

(t-Butylamino)(dimethyl)(tetramethylcyclopentadi-2,4-enyl)silane

A solution of 11.07 g (151 mmol) t-butyl amine in 20 mL THF was added during 5 minutes to a solution of 13.00 g (60.5 mmol) (chloro)(dimethyl)(tetramethylcyclopentadienyl)silane in 300 mL THF. A precipitate formed immediately. The slurry was stirred for 3 days, then the solvent was removed, the residue was extracted with pentane and filtered. The pentane was removed under reduced pressure to give the product as a light-yellow oil.

Step 3

Dilithium (tert-butylamido)(dimethyl)(tetramethylcyclopentadienyl)silane

To a solution of 3.000 g (11.98 mmol) (t-Butylamino)(dimethyl)(tetramethylcyclopentadienyl)silane in 100 mL ether was slowly added 9.21 mL of 2.6 M (23.95 mmol) butyl lithium in mixed $C_6$ alkane solvent. A white precipitate formed and the reaction mixture was stirred overnight, then filtered. The solid was washed several times with ether then dried under reduced pressure to give the product as a white powder.

Step 4

(t-Butylamido)dimethyl(tetramethyl-$\eta^5$-cyclopentadienyl)silane titanium dichloride 0.721 g (3.80 mmol) Of $TiCl_4$ was added to 30 mL frozen (−196° C.) THF. The mixture was allowed to warm to −78° C. (dry ice bath). To the resulting yellow solution was slowly added a solution of 1.000 g (3.80 mmol) dilithium (t-butylamido)(dimethyl)tetramethylcyclopentadienyl) silane in 30 mL THF. The solution was allowed to warm to room temperature while stirring overnight. The solvent was removed from the resulting very dark solution. The residue was extracted with pentane and filtered. Cooling in a freezer caused the separation of a very soluble dark reddish-brown material from a light yellow-green crystalline solid. The solid was filtered out and recrystallized from pentane to give the olive-green catalyst complex product.

Catalyst Complex Activation Mixture

Methylaluminoxane (obtained commercially from Schering AG and designated herein as MAO) 10% by weight in toluene, is used in the examples described herein as a cocatalyst together with the catalyst complex to form the activated Ti stock solution catalyst mixture. (Other MAO preparations are disclosed, e.g., in U.S. Pat. Nos. 5,041,583, 5,041,584 and 5,041,585, the disclosures of which are incorporated herein by reference.) The catalyst composition mixture is mixed for a few minutes and transferred by syringe to a catalyst injection cylinder on the polymerization reactor.

The compositions described in Table 2 are prepared with the same Ti stock solution and varying amounts of MAO solution and isoparaffinic solvent. Table 3 shows examples of a zirconium catalyst prepared in a similar manner from an equivalent complex ([Zr]=0.005 M) and the same MAO stock solution.

Single Polymerizations using 2 Constrained Geometry Catalysts having Differing Reactivities A stirred, one-gallon (3.79 L) autoclave reactor is charged with two liters of an isoparaffinic hydrocarbon (Isopar™ E made by Exxon) and the alpha-olefin comonomer before heating to the temperature specified in Table 1. Hydrogen (10 mmol) is then added to the reactor, followed by ethylene sufficient to bring the total pressure to 450 pounds per square inch gauge (psig). An amount of the selected mixed constrained geometry activated catalyst mixture, as described under the catalyst complex preparation section herein, is injected into the reactor. The reactor temperature and pressure are maintained constant at the desired final pressure and temperature by continually feeding ethylene during the polymerization run and cooling the reactor as necessary. After a 10 minute reaction time, the ethylene is shut off and the hot solution transferred into a nitrogen-purged resin kettle. After drying, the samples are then weighed to determine catalyst efficiencies followed by melt index (ASTM D-1238, condition 190° C./2.16 kg) and density (ASTM D-792) measurements. The polymerization reaction conditions specified in Table 1 are used for both sets of homogeneous copolymers listed in Tables 2 and 3.

TABLE 1

Polymerization conditions for single catalyst runs

| Ex. | Reactor Temp. (° C.) | Octene (moles) | Hydrogen (mmol) | Al:M* Ratio |
|---|---|---|---|---|
| 1 & 1A | 150 | 2.5 | 10 | 500 |
| 2 & 2A | 150 | 2.5 | 10 | 500 |
| 3 & 3A | 130 | 1 | 10 | 500 |
| 4 & 4A | 130 | 1 | 10 | 250 |
| 5 & 5A | 130 | 1 | 10 | 100 |

*M = selected metal atom (e.g., Ti or Zr)

Properties of some of the homogeneous copolymers made by using only a titanium based constrained geometry catalyst are listed in Table 2, while properties of the homogeneous copolymers made by using only a zirconium based constrained geometry catalyst are listed in Table 3. Even though the comonomer 1-octene is added to each separate reaction, very little of the 1-octene is incorporated into the copolymer when the catalyst is a zirconium catalyst (indicated by higher interpolymer density), due to the lower reactivity of the zirconium catalyst. The copolymers made using the titanium based constrained geometry catalyst have lower densities, indicating higher incorporation of 1-octene and higher reactivity of the titanium catalyst.

TABLE 2

Copolymer properties using titanium constrained geometry catalyst

| Ex. | Titanium (mmol) | Density (g/cm$^3$) | $I_2$ (g/10 min) | Melt Point (° C.) | $M_w$ | $M_n$ | $M_w/M_n$ |
|---|---|---|---|---|---|---|---|
| 1 | 0.02 | 0.9130 | 13.6 | 94.7 | 51000 | 14000 | 3.64 |
| 2 | 0.02 | 0.9121 | 10.1 | 95.9 | 53700 | 14700 | 3.65 |
| 3 | 0.02 | 0.9198 | 0.18 | 108.8 | 105000 | 23200 | 4.53 |
| 4 | 0.02 | 0.9197 | 0.15 | 109.8 | 136000 | 29400 | 4.63 |
| 5 | 0.02 | 0.9153 | 0.15 | 104.9 | 146000 | 26300 | 5.55 |

TABLE 3

Copolymer properties using zirconium constrained geometry catalyst

| Ex. | Zirconium (mmol) | Density (g/cm$^3$) | Melt Index (g/10 min) | Melt Point (° C.) | $M_w$ | $M_n$ | $M_w/M_n$ |
|---|---|---|---|---|---|---|---|
| 1A | 0.020 | 0.9468 | 98.9 | 123.9 | 39800 | 7470 | 5.33 |
| 2A | NM | NM | NM | NM | NM | NM | NM |
| 3A | 0.005 | 0.9556 | 20.6 | 128.7 | 62200 | 14000 | 4.44 |
| 4A | 0.010 | 0.9533 | 12.2 | 128.4 | 60100 | 16800 | 3.58 |
| 5A | 0.020 | 0.9519 | 11.5 | 128.6 | 56900 | 17100 | 3.33 |

NM = Not Measured

The constrained geometry catalysts can be used to polymerize the interpolymer products of the present invention in multiple reactor configurations as well. For example, one constrained geometry catalyst can be injected into one reactor and another constrained geometry catalyst having a different reactivity injected into another reactor. Or, the same constrained geometry catayst can be injected into more than one reactor and the reactors operated at differing temperatures to effect differing catalyst reactivities.

Such multiple reactor schemes are well known to those skilled in the art of ethylene interpolymerization. For example, series and parallel dual reactor polymerizations are disclosed in U.S. Pat. No. 3,914,342, the disclosure of which is incorporated herein by reference.

Single Injection Polymerizations

A stirred, one-gallon (3.79 L) autoclave reactor is charged with two liters of an isoparrafinic hydrocarbon (e.g., Isopar® E made by Exxon) and the selected alpha-olefin comonomer before heating to the temperature specified in Table 4. Hydrogen (10 mmol) is then added to the reactor, followed by ethylene sufficient to bring the total pressure to 450 pounds per square inch gauge (psig). An amount of the mixed constrained geometry activated catalyst mixture (as described under the catalyst activation) is injected into the reactor. The reactor temperature and pressure are maintained constant at the desired final pressure and temperature by continually feeding ethylene during the polymerization run and cooling the reactor as necessary. After a 10 minute reaction time, the ethylene is shut off and the hot solution transferred into a nitrogen-purged resin kettle. After drying, the samples are then weighed to determine catalyst efficiencies followed by melt index and density measurements.

Examples 6–12 are examples of ethylene/1-octene polymerizations performed in a single reactor, using a single injection of an activated mixture of constrained geometry catalysts (titanium and zirconium) at a methylaluminoxane (MAO):total catalyst metal ratio of about 500:1 and are described in Table 4. Surprisingly, compression molded films made from the novel interpolymer product of Example 10 had a specular transmission (i.e., clarity) (ASTM D 1746) of about 4, while for compression molded films made from the novel interpolymer product of Examples 11 and 12, the specular transmission was less than about 1. The higher reactor polymerization temperature used to make the interpolymer product of Example 10 (160° C.) therefore improves the specular transmission of film made therefrom, especially when compared withe film made from interpolymer products polymerized at temperatures lower than about 160° C.

Example 13 is a comparative example using only a single constrained geometry catalyst (MAO:Ti ratio of about 500:1) at a single reaction temperature (110° C.).

Example 14 illustrates the use of a single activated constrained geometry. (Titanium at MAO:Ti ratio of about 500:1) catalyst at two different reactor temperatures (110° C. and 150° C.).

Examples 15–19 show ethylene/1-octene interpolymerizations using mixed constrained geometry catalysts (Ti and Zr) at MAO:total metal concentrations of 350:1.

Examples 20–22 show data relating to interpolymerizations of ethylene with tetradecene, octadecene and cyclooctene, respectively. For Examples 20 and 21, the MAO:total metal concentration is about 500:1 while for Example 22 the MAO:total metal concentration is about 750:1.

Examples 23–25 describe ethylene/1-propene/1-octene terpolymer interpolymerizations, each using a single injection of a mixture of two constrained geometry catalysts (titanium and zirconium), each using methylaluminoxane as a cocatalyst to form the activated catalyst mixture.

TABLE 4

Polymerizations using 2 constrained geometry catalysts having differing reactivities

| Ex. | 1-octene (ml) | $H_2$ (mmol) | mmole Ti | mmole Zr | Ti:Zr ratio | Reactor Temp. (° C.) | Sample Weight (grams) | Gradient Density (g/cm$^3$) | $I_2$ (g/10 min) | $I_{10}/I_2$ | Cryst. Onset (° C.) | $M_w/M_n$ |
|---|---|---|---|---|---|---|---|---|---|---|---|---|
| 6 | 150 | 10 | .016 | .004 | 4:1 | 130 | 180 | .9280 | .7 | 13.4 | 112.8 | 4.81 |
| 7 | 150 | 10 | .0121 | .008 | 3:2 | 130 | 180 | .9392 | 1.5 | 12.3 | 114.8 | 4.57 |
| 8 | 300 | 10 | .0046 | .016 | 3.5:1 | 130 | 190 | .9434 | 13.2 | 7.5 | 114.8 | 3.22 |
| 9 | 300 | 10 | .008 | .002 | 4:1 | 130 | 172 | .9261 | 2.5 | 10.3 | 113.5 | 4.13 |
| 10 | 150 | 10 | .0093 | .00125 | 8:1 | 160 | 40 | .9367 | NM* | NM* | 113.3 | 3.64 |
| 11 | 150 | 20 | .0093 | .00125 | 8:1 | 130 | 128 | .9260 | 3.8 | 9.7 | 112.7 | 3.64 |
| 12 | 150 | 30 | .0093 | .00125 | 8:1 | 100 | 218 | .9250 | 10.3 | 7.2 | 114.5 | 2.66 |
| 13c | 150 | 20 | .02 | 0 | 0 | 110 | 209 | .9136 | .2 | 15.6 | 96.3 | 3.89 |
| 14*** | 150 | 40 | .012 | 0 | 0 | 110/150 | 172 | .9236 | 13.1 | 7.2 | 108.1 | 2.43 |
| 15** | 150 | 30 | .019 | .001 | 20:1 | 130 | 188 | .9195 | NM | NM | 99.8 | NM |
| 16** | 150 | 30 | .019 | .001 | 20:1 | 162 | 82 | NM | NM | NM | 104.1 | NM |
| 17** | 150 | 10 | .019 | .001 | 20:1 | 160 | 70 | .9290 | NM | NM | 105.2 | NM |
| 18** | 150 | 30 | .0095 | .0005 | 20:1 | 100 | 105 | NM | NM | NM | 95.9 | NM |
| 19** | 150 | 20 | .019 | .001 | 20:1 | 100 | 225 | .9120 | NM | NM | 94 | NM |

MAO: total metal ratio for Examples 6–14 = 500:1
*NM = Not Measured
**MAO: total metal ratio for Examples 15–19 = 350:1
***Half of the catalyst is injected at reactor temp. of 110° C., then the reactor temp was increased to 150° C. and the other half of the catalyst injected
c = Comparative Example only

TABLE 5

Polymerizations using comonomers other than 1-octene using 2 constrained geometry catalysts having differing reactivities

| Ex. | Comonomer (ml added) | mmole Ti | mmole Zr | Ti:Zr ratio | Reactor Temp. (° C.) | Sample Weight (grams) | Gradient Density (g/cm$^3$) | $I_2$ (g/10 min) | MAO:soluble Ti | Cryst. Onset (° C.) | $M_w/M_n$ |
|---|---|---|---|---|---|---|---|---|---|---|---|
| 20 | tetradecene (300) | .019 | .001 | 19:1 | 130 | 275 | .9245 | 96.8 | 500:1 | 96.8 | 2.86 |
| 21 | octadecene (300) | .019 | .001 | 19:1 | 130 | 250 | .9166 | 45.1 | 500:1 | 104.9 | 3.91 |
| 22 | cyclooctene (350) | .019 | .001 | 19:1 | 130 | 150 | .9265 | 32.3 | 750:1 | 121.3 | 3.65 |

TABLE 6

Polymerizations of ethylene/1-propene/1-octene terpolymers using 2 constrained geometry catalysts having differing reactivities

| Ex. | 1-octene (ml) | 1-propene (gm) | mmole Ti | mmole Zr | Ti:Zr ratio | Reactor Temp. (° C.) | Sample Weight (grams) | Gradient Density (g/cm$^3$) | $I_2$ (g/10 min) | Cryst. Onset (° C.) | $M_w/M_n$ |
|---|---|---|---|---|---|---|---|---|---|---|---|
| 23 | 150 | 40 | .019 | .001 | 19:1 | 130 | 75 | .9051 | NF* | 103.7 | 4.62 |
| 24 | 150 | 20 | .019 | .001 | 19:1 | 140 | 75 | .9158 | 7 | 109.2 | 4.52 |
| 25 | 150 | 10 | .019 | .001 | 19:1 | 150 | 75 | .9273 | 21.8 | 108 | 4.05 |

*NF = No Flow (i.e., the molecular weight is very high) MAO: total metal = 500:1 for Ex. 23–25

What is claimed is:

1. An ethylene/alpha-olefin interpolymer product having from about 5 to about 20 weight percent comonomer content, a melt index of from about 0.5 to about 50 grams/10 minutes, an $I_{10}/I_2$ ratio of from about 6 to about 12, and an Mw/Mn of from about 2 to about 6, wherein at least one part of the interpolymer product has a melting point less than about 115° C., while at least another part has a melting point greater than about 120° C.

2. The interpolymer product of claim 1 wherein the part of the interpolymer product having a melting point less than about 115° C. is from about 20 to 80 percent of the interpolymer product.

* * * * *